(12) United States Patent
Margolis et al.

(10) Patent No.: US 10,445,073 B2
(45) Date of Patent: Oct. 15, 2019

(54) SEPARATION OF USER INTERFACE LOGIC FROM USER INTERFACE PRESENTATION BY USING A PROTOCOL

(71) Applicant: INTERNATIONAL BUSINESS MACHINES CORPORATION, Armonk, NY (US)

(72) Inventors: Stas Margolis, Alfey-Menashe (IL); Nadav Parag, Rehovot (IL); Vladimir Shalikashvili, Petah-Tiqwa (IL); Moshe Weiss, Petah Tiqwa (IL)

(73) Assignee: International Business Machines Corporation, Armonk, NY (US)

( * ) Notice: Subject to any disclaimer, the term of this patent is extended or adjusted under 35 U.S.C. 154(b) by 797 days.

(21) Appl. No.: 14/937,212

(22) Filed: Nov. 10, 2015

(65) Prior Publication Data
US 2017/0131849 A1    May 11, 2017

(51) Int. Cl.
| G06F 3/00 | (2006.01) |
|---|---|
| G06F 8/38 | (2018.01) |
| G06F 8/20 | (2018.01) |
| G06F 8/36 | (2018.01) |
| G06F 3/01 | (2006.01) |

(52) U.S. Cl.
CPC .................. *G06F 8/38* (2013.01); *G06F 8/24* (2013.01); *G06F 8/36* (2013.01)

(58) Field of Classification Search
None
See application file for complete search history.

(56) References Cited

U.S. PATENT DOCUMENTS

| 2003/0145305 A1 | 7/2003 | Ruggier | |
|---|---|---|---|
| 2007/0083533 A1* | 4/2007 | Mirkazemi | G06F 16/958 |
| 2009/0019549 A1* | 1/2009 | Reid | H04L 9/3247 726/27 |
| 2009/0158246 A1* | 6/2009 | Sifter | G06F 8/20 717/105 |
| 2011/0160879 A1* | 6/2011 | Gutha | G06F 8/20 700/86 |
| 2012/0166985 A1* | 6/2012 | Friend | G06F 9/4448 715/765 |
| 2012/0317504 A1* | 12/2012 | Patel | G06F 9/4443 715/762 |
| 2013/0086624 A1* | 4/2013 | Powell | G06Q 10/06 726/1 |

(Continued)

FOREIGN PATENT DOCUMENTS

CN    102750145    10/2012

OTHER PUBLICATIONS

Goderis, S. et al, "DEUCE: separating concerns in user interfaces", IEEE, International Conference on Software Engineering Advances (ICSEA 2007) 2007, pp. 1-7.

LL. Post, et al., "Dynamically Configurable User Interface for the Manipulation of Data Objects", IP.com, Published Mar. 1, 1994, Prior Art Database Technical Disclosure, TDB v37, n3, Mar. 1994, pp. 23-30, IP.com No. 000111537.

(Continued)

*Primary Examiner* — Toan H Vu
(74) *Attorney, Agent, or Firm* — Rabindranath Dutta; Konrad, Raynes, Davda and Victor LLP

(57) ABSTRACT

A single presentation logic that is independent of a user interface framework is provided. Also provided is a protocol to interface the single presentation logic to the user interface framework. A plurality of user interfaces is configured to be plugged to the single presentation logic.

17 Claims, 11 Drawing Sheets

(56) References Cited

U.S. PATENT DOCUMENTS

| | | | | |
|---|---|---|---|---|
| 2013/0086657 | A1* | 4/2013 | Srinivasan | H04L 63/10 726/6 |
| 2013/0227412 | A1* | 8/2013 | Ornstein | G06F 3/04847 715/711 |
| 2014/0172799 | A1* | 6/2014 | Dorman | G06F 17/30174 707/638 |
| 2015/0040103 | A1* | 2/2015 | Nyisztor | H04L 41/082 717/121 |
| 2015/0160628 | A1* | 6/2015 | Kalafut | G05B 15/02 700/275 |
| 2015/0350030 | A1* | 12/2015 | Nordick | H04L 41/22 715/733 |
| 2017/0115968 | A1* | 4/2017 | Fukala | G06F 8/38 |
| 2017/0160969 | A1* | 6/2017 | Kumarasamy | G06F 3/0619 |
| 2017/0299633 | A1* | 10/2017 | Pietrowicz | G01R 1/20 |

OTHER PUBLICATIONS

"Method and Apparatus for Dynamic Rule Based UI", IP.com, Prior Art Database Technical Disclosure, IP.com No. 000236228, IP.com Electronic Publication Apr. 14, 2014, pp. 5.

"Model-View-Controller", Wikipedia, [online][retrieved Oct. 20, 2015], pp. 2, https://en.wikipedia.org/wiki/Model—view—controller.

"Model View ViewModel", Wikipedia, [online][retrieved Oct. 20, 2015], pp. 2, https://en.wikipedia.org/wiki/Model_View_ViewModel.

"Chapter 6: Presentation Layer Guidelines", [online][retrieved Oct. 20, 2015], pp. 7, https://msdn.microsoft.com/en-us/library/ee658081.aspx.

* cited by examiner

SEPARATION OF USER INTERFACE LOGIC FROM USER INTERFACE PRESENTATION BY USING A PROTOCOL

BACKGROUND

1. Field

Embodiments relate to the separation of user interface logic from user interface presentation by using a protocol.

2. Background

User interface (UI) frameworks may separate the code that controls the UI presentation from the code that controls the logical behavior. The UI presentation may include graphics, animations, layouts etc., and the code for logical behavior may manage logical states, when and what data should be presented to a user, and reactions to user actions.

The separation of the code that controls the UI presentation from the code that controls the logical behavior is desirable since the development of the two types of code may require different development skills. Furthermore each type of code may be changed without any change being made to the other. Coupling of the UI presentation code with the code for the logical behavior may make maintenance harder and more complex. For that reason coding patterns such as Model View Controller (MVC) and Model View ViewModel (MVMM) may be used to separate the code that controls the UI presentation from the code that controls the logical behavior.

MVC is a software architectural pattern for implementing user interfaces. It divides a given software application into three interconnected parts, so as to separate internal representations of information from the ways that the information is presented to or accepted from the user. The central component of MVC, the model, captures the behavior of the application in terms of its problem domain, independent of the user interface. The model directly manages the data, logic and rules of the application. A view can be any output representation of information, such as a chart or a diagram. The third part, the controller, accepts input and converts it to commands for the model or view. In addition to dividing the application into three kinds of components, the MVC design defines the interactions between them.

MVVM is an architectural pattern for software development. MVVM abstracts a view's state and behavior. As in the MVC, the view is the user interface. The view model is an abstraction of the view that exposes public properties and commands. Instead of the controller of the MVC pattern, MVVM has a binder. In the view model, this binder mediates communication between the view and the data binder. The binder frees the developer from being obliged to write logic to synchronize the view model and view.

Presentation logic is the application code that defines the logical behavior and structure of the application in a way that is independent of any specific user interface implementation. When implementing the separated presentation pattern, the presentation logic components may include a presenter, a presentation model, and ViewModel components. FIG. 1 shows a prior art framework 100 that shows interactions between a presentation logic code 102 and a UI logic code 104, via notifications 106, data binding 108, and commands 110 between a view 112 and a ViewModel 114, where the view 112 corresponds to a user interface 116.

Such UI frameworks may allow separation of component logic from its presentation. There are numerous UI frameworks today that are targeted towards separating the logic and the presentation. Some frameworks run both the presentation side and the presentation logic in the same process like in desktop graphical user interface (GUI) frameworks, such as, JavaFX*, Swing, Windows Presentation Foundation (WPF). Certain UI frameworks may provide means for separation between the presentation and its logic for each component (i.e. table, form etc.) using data-binding. Similarly, in the world of Web UI (e.g., JavaScript*/HTML5), there are numerous JavaScript frameworks that provide a similar separation for each component, such as, AngularJS, Backbone.js and Ember.js.

*JavaFX, JavaScript are trademarks or registered trademarks of Oracle America, Inc.

SUMMARY OF THE PREFERRED EMBODIMENTS

Provided are a method, a system, a computer program product in which a single presentation logic that is independent of a user interface framework is provided. Also provided is a protocol to interface the single presentation logic to the user interface framework. A plurality of user interfaces is configured to be plugged to the single presentation logic.

In certain embodiments, a user interface of an application receives updates for a component from the single presentation logic via the protocol.

In additional embodiments, the single presentation logic receives changes in components data from the user interface.

In additional embodiments, the updates include hierarchy changes and data that are to be displayed to a user for the component.

In further embodiments, a controls generator that comprises a unique adapter between a logic nodes container comprising the single presentation logic and a user interface layer corresponding to the plurality of user interfaces, translates addition and deletion of components in the logic nodes container for the plurality of user interfaces.

In additional embodiments, entities in code for the protocol include at least a logic node that represents a user interface component in the single presentation logic, wherein: a read-only property of the logic node is configurable only in the presentation logic; a writable property of the logic node is configurable both in the presentation logic and on the plurality of user interfaces; and an invokable read-only property is invokable only by a user interface.

In certain embodiments, a nodes container is an entity in the single presentation logic, wherein the nodes container holds a hierarchy of presentation logic nodes and sends hierarchy change messages to a user interface layer that comprises a components builder.

BRIEF DESCRIPTION OF THE DRAWINGS

Referring now to the drawings in which like reference numbers represent corresponding parts throughout.

DETAILED DESCRIPTION

Figure 1:
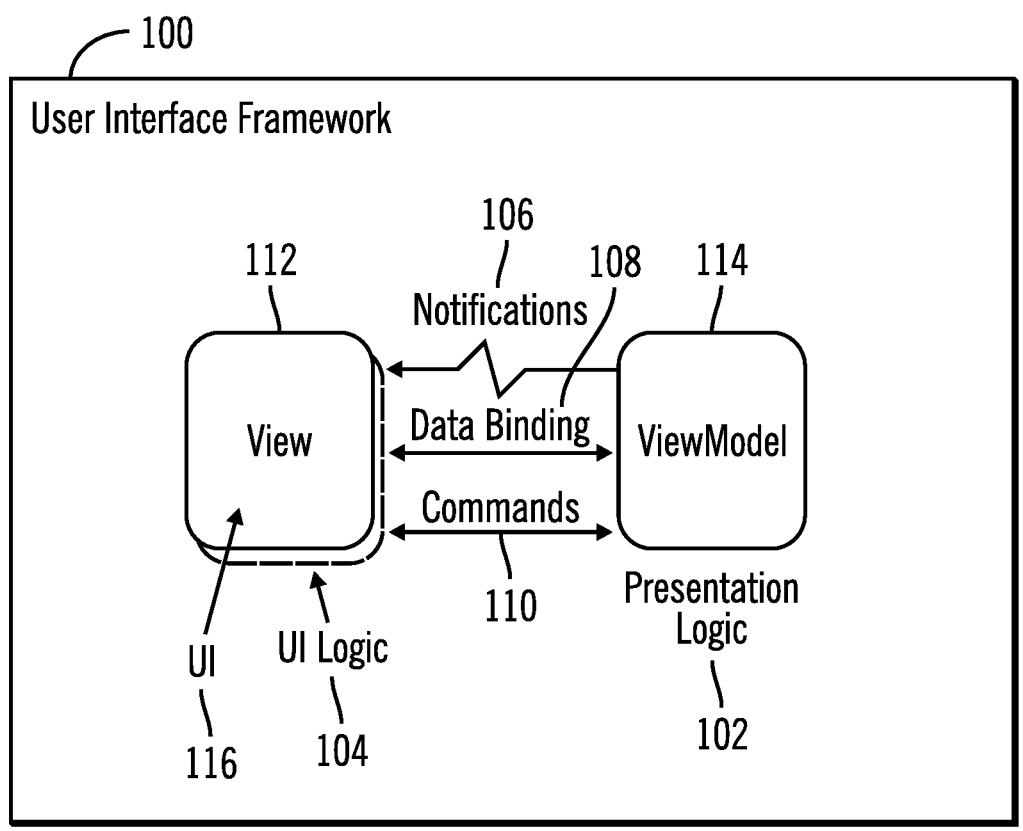
FIG. 1 illustrates a block diagram of a prior art user interface framework.

In the following description, reference is made to the accompanying drawings which form a part hereof and which illustrate several embodiments. It is understood that other embodiments may be utilized and structural and operational changes may be made.

Potential Limitations of Prior Frameworks

The above mentioned frameworks are widely used and successful but provide two major limitations:

(A) The presentation components and their logic interact with a specific application programming interface (API) using direct calls or bindings. They are inseparable in terms of coding language, skills and technology. Once an UI framework is selected, both the presentation and its logic use the same framework.

(B) The frameworks are UI centric which means that the application first initiates the UI components hierarchy and then the presentation logic is created accordingly. The complete state of the application is controlled by the UI since the UI holds the hierarchy of the components. If a user, for example, were to close a dialog and change the state of the application to enter a new mode with a different hierarchy of components, then these changes should all be done directly on the UI components since this is where the hierarchy is defined.

For example, in a certain situation, consider an application that prefers to display a login dialog at start. Depending on the role of the user, a determination may be made as to which components to show. For administrator users, a filter, a table and a form may be shown, whereas for other users only a form may be shown. The form may also be configured to determine which fields to show depending on user actions or user role. In certain situations the system performs a logout of the user automatically once a certain amount of time has elapsed.

It is desirable that the presentation logic is not aware of the UI elements that are shown to the user. This decoupling allows changes in the UI code without breaking anything in the presentation logic. But the above example forces programmers to be either aware of UI components while changing their hierarchy directly, or to send some proprietary command to the UI so that the UI is able change the hierarchy state. So the programmer either couples the code with specific UI elements or involves the UI with the application logic. The separation in this case is limited. If the programmer would like to change the UI layer to use a different technology/framework/components but keep the presentation logic, it would require in most cases a complete rewrite of the code. This is why changing a UI framework is difficult, and the presentation logic is likely to be lost while changing the UI framework.

There are no known solutions that address the problems that arise because the presentation components and their logic interact with a specific application programming interface (API) using direct calls or bindings. To address the UI centricity of the frameworks, some web frameworks allow the creation of an application that is presentation logic centric. Components are defined by using Java classes, and even children may be added to a component (thus changing the hierarchy). Changes in properties on those component instances, may trigger a reload on the browser side and may perform a re-rendering [e.g., by fetching a new hypertext markup language (HTML) section from the server] for the components that may have changed. One drawback of these frameworks is that in many cases most of the page is reloaded when a change that is high in the hierarchy occurs. The whole lifecycle of components that are updated and re-rendered is quite slow since the whole component HTML is sent again to the browser.

General Two-Way Protocol

Certain embodiments provide a general two-way protocol that may enable the following:

(1) The UI of an application may get optimized updates from the corresponding presentation logic including hierarchy changes and data to show to the user for each component. The data is not graphical, and only includes texts and values; and (2) The presentation logic may get from the UI the changes in components data (e.g., a change in a text-field) and may enable the UI to invoke actions for specific actions.

With the above strategy, the system may have some major advantages:

(1) The presentation logic is independent of the UI technology or framework. The same presentation logic may be plugged to different technologies. For example, a desktop application written with the above separation may be migrated to Web technology by rewriting only the thin UI part. The behavior of each text-field, drop-down, table, etc., will stay the same after migrating to the Web.

(2) The application may run with no UI attached. Automation procedures may hook to the presentation logic using the protocol just like any other UI. This can enable running end to end automation flows to test the application presentation logic. Note that there is a great difference between testing presentation logic vs business logic. The presentation logic includes the behavior of every component in the application such as text-fields, buttons and their states (e.g., enable/disabled), table, dialogs etc. while the business logic may include a request to a back-end to retrieve raw data.

(3) A single presentation logic can even be hooked to two UIs at the same time. Such a mechanism may be used to share an application state between two different users. Both of them may be able to make changes to the application similar to remote desktop. The difference here is that each of them might be seeing a different picture if they use a different UI framework (i.e. a desktop JavaFX application sharing its state using a web UI).

(4) By combining (2) and (3) the system may have an automation procedure hooking to the application just like any other UI and changing the application state while a real user is using the application. This may be used to walk through the user in the application and demonstrate usage of features by using predefined actions.

(5) In case the presentation logic resides in a remote server, the server may also save for the user the exact application state. When the user performs a re-login from another device (which uses the same or a different UI framework), he may be able to continue exactly from the point where he previously left off.

(6) The system may also have the option to "record" all the protocol interaction between the UI and the presentation logic. This can be used to analyze user actions and even replay them for debugging purposes.

Exemplary Embodiments

Figure 2:
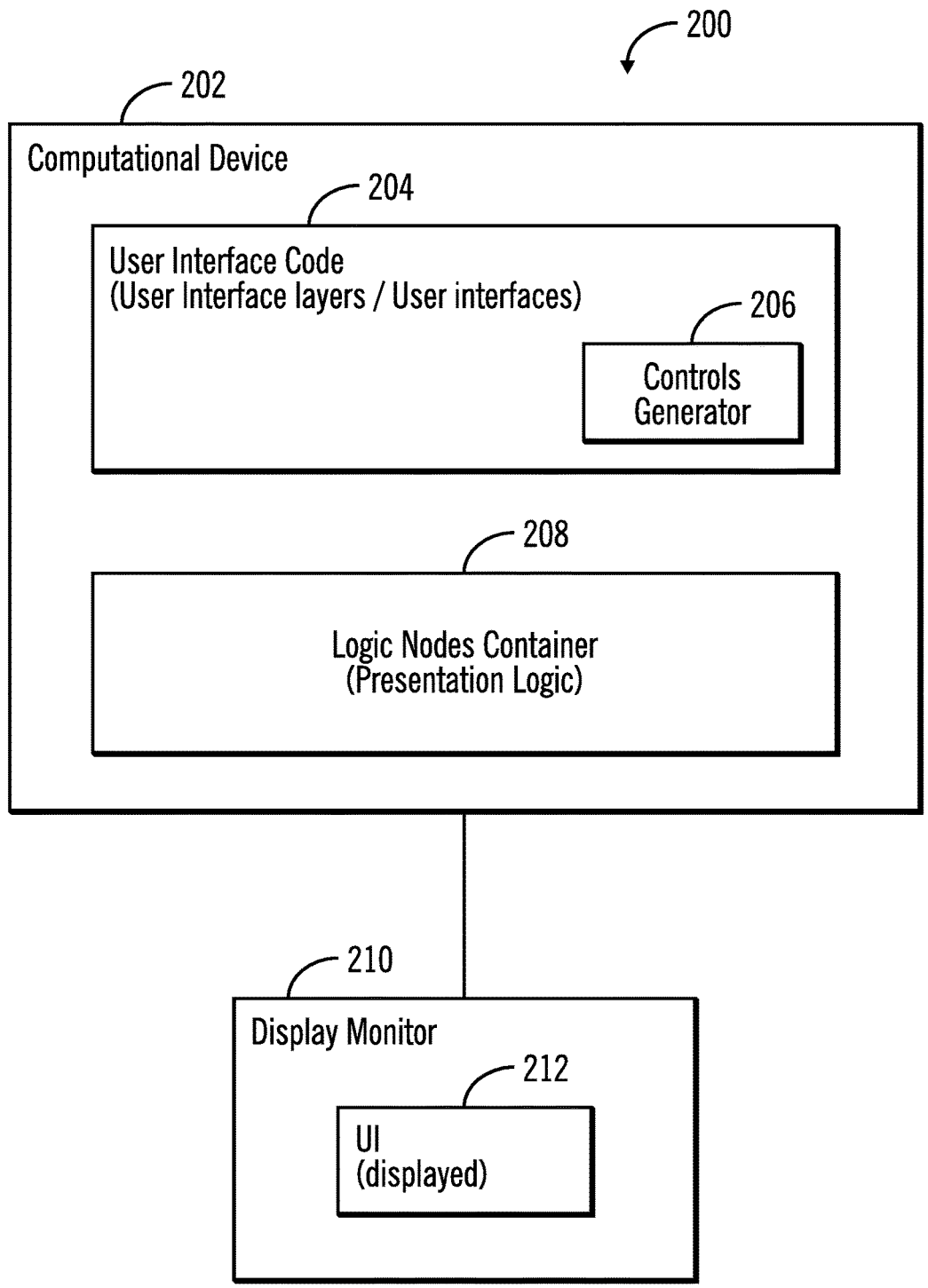
FIG. 2 illustrates a block diagram of a computing environment comprising a computational device in which a user interface code having a controls generator is separated from a logic nodes container, in accordance with certain embodiments.

FIG. 2 illustrates a block diagram of a computing environment 200 comprising a computational device 202 in which a user interface code 204 having a controls generator 206 is separated from a logic nodes container 208, in accordance with certain embodiments. The user interface code 204 may comprise a user interface layer and the logic nodes container 208 may comprise the presentation logic.

The computational device 202 may comprise any suitable computational device including those presently known in the art, such as, a personal computer, a workstation, a server, a mainframe, a hand held computer, a palm top computer, a telephony device, a network appliance, a blade computer, a processing device, a controller, etc. In certain embodiments, the user interface code 204, the controls generator 206, and the logic nodes container 208 may be implemented in software, firmware, hardware or any combination thereof.

The logic nodes container 208 is a class, a data structure, or an abstract data type whose instances are collections of other objects. In other words, the logic nodes container 208 stores objects in an organized way, and the logic nodes container 208 may have specific access rules. The logic nodes container 208 may correspond to the presentation logic.

A display monitor 210 that is coupled to the computational device 202 either directly or over a network may display a user interface 212 to a user, where the user may interact with controls displayed on the user interface 212.

Figure 3:
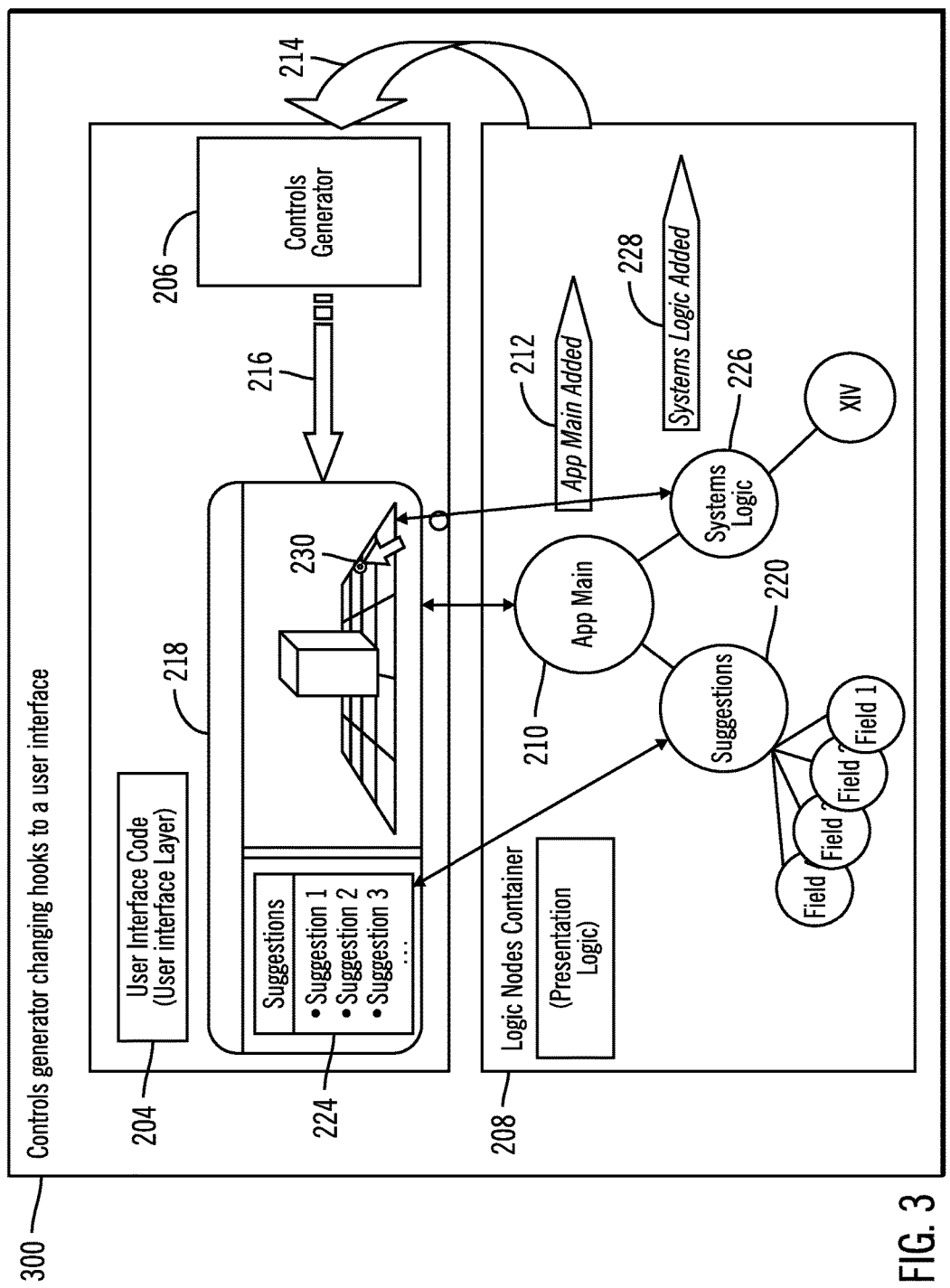
FIG. 3 illustrates a block diagram that shows how the controls generator changes hooks to the user interface when changes are made to the logic nodes container, in accordance with certain embodiments.

FIG. 3 illustrates a block diagram 300 that shows how the controls generator 206 changes hooks to the user interface code 204 when changes are made to the logic nodes container 208, in accordance with certain embodiments.

The controls generator 206 is written once and the controls generator 206 maps the hierarchy in the logic nodes container 208 to the user interface code 204. When changes are made to the logic nodes container 208, the controls generator 206 changes the hooks to the user interface code 204. Thus the controls generator 206 hooks up user interface components of the user interface code 204 to the presentation logic components provided by the logic nodes container 208.

The logic nodes container 208 does not have knowledge of how elements are displayed via the user interface code 204. In certain embodiments, the components in the logic nodes container 208 are hierarchically arranged. For example, when the node App Main 210 is added (reference numeral 212) then the controls generator 206 which is a unique adapter interprets (reference numeral 214) the addition of App Main 210 and translates (references numeral 216) the addition of App Main 214 for the user interface code 204 such that App Main 210 maps to the element 218 shown in FIG. 3.

Similarly, the addition of the suggestions node 220 is translated by the controls generator 206 to the element 224 that shows a list of suggestions in the user interface. When the systems logic node 226 is added (reference numeral 228) then it is translated by the controls generator 206 to the element 230 as shown in FIG. 3.

Therefore, in FIG. 3, the logic nodes container 208 has hierarchical components and a single unique controls generator 206 that maps changes in the logic nodes container 208 to the user interface code 204. Thus the logical nodes container 208 is separated from the user interface code 204 via the controls generators 206 that acts as a unique adapter for multiple user interfaces.

Figure 4:
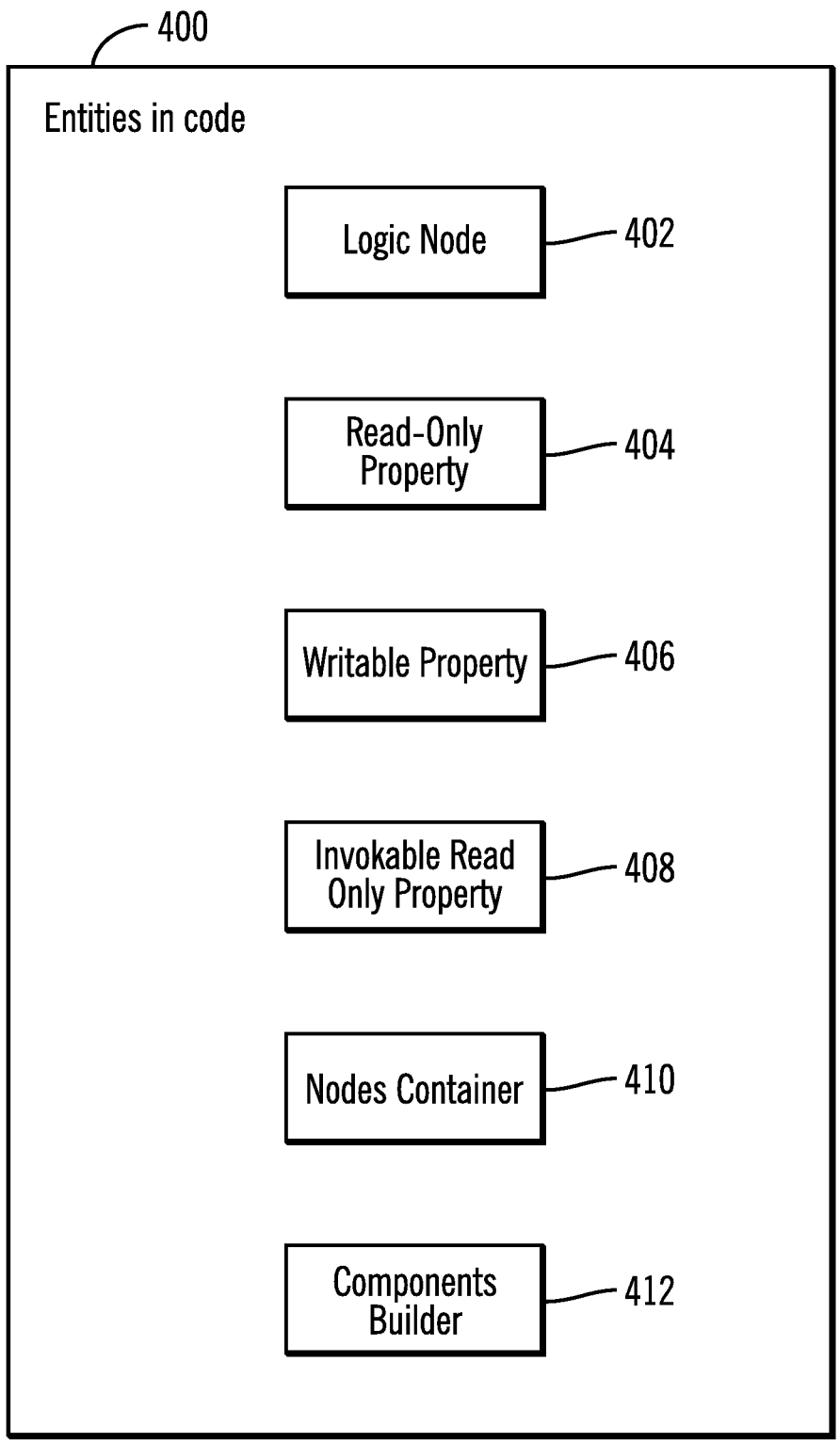
FIG. 4 illustrates a block diagram that shows entities in the code, in accordance with certain embodiments.

FIG. 4 illustrates a block diagram 400 that shows entities in the code, in accordance with certain embodiments. In certain embodiments, the entities may be implemented in the computational device 202.

The logic node 402 represents some UI component in the presentation logic 208 without coupling to the way it is displayed graphically. It contains all logical behavior of the component in terms of what data should be displayed to the user but not how. The logic node 402 contains a set of properties, where each property contains some data which may be required by the UI component.

The read-only property 404 is a property of a logic node 402 which is only configurable in the presentation logic side. The presentation logic 208 may decide to change the value of such a property. An appropriate message will be sent to the UI layer 204 with the new value by using the protocol defined below.

The writable property 406 is a property of a logic node 402 which is configurable both from UI side 204 and presentation logic side 208.

The invokable read-only property 408 is a property that the UI may invoke. This kind of property is equivalent to some action that needs to be performed and may include actions used with buttons. It also contains a read-only value defined by the presentation logic 208 which defines the state of the action. A "Disabled State" value for the invokable read-only property 408 means that the action cannot be invoked (it also can contain a reason string so that the UI can display in some way why it is disabled). An "Enabled State" value for the invokable read-only property 408 means that the action can be invoked.

The nodes container 410 is an entity in the presentation logic 208 that holds the hierarchy of logic nodes and sends hierarchy changes messages to the UI layer 204 (e.g., to the components builder 412 entity in the UI layer 204).

The components builder 412 is an entity in the UI layer 204 that accepts hierarchy changes messages (from the nodes container 410), and acts accordingly (e.g., create a new UI Component that corresponds the node that was created in the presentation logic and add it as a child to an existing component).

In certain embodiments, these various entities in code 400 together implement the operations performed by the elements shown earlier in FIGS. 2-3.

Figure 5:
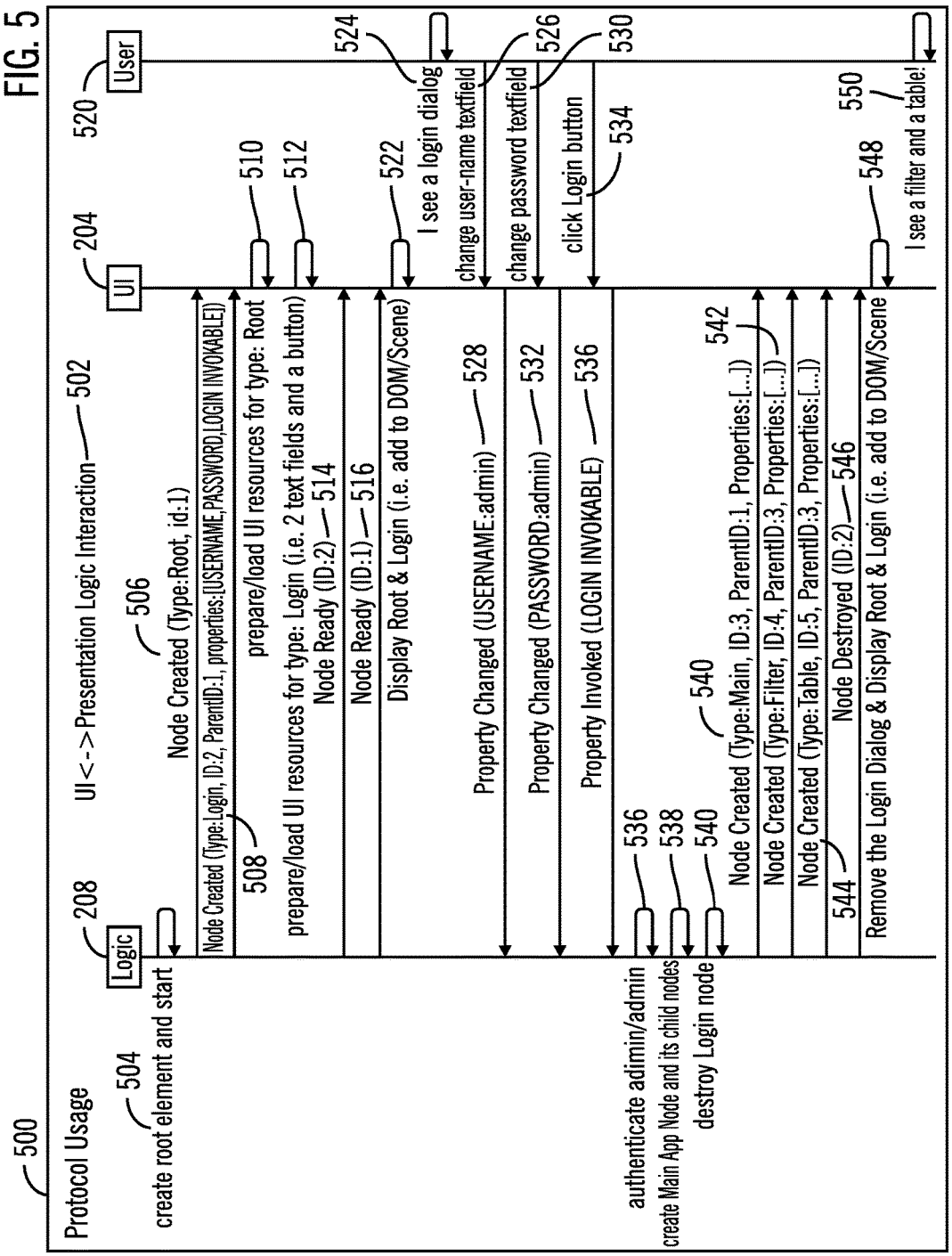
FIG. 5 illustrates a block diagram that shows interactions between the user interface and the presentation logic, in accordance with certain embodiments.

FIG. 5 illustrates a block diagram 500 that shows interactions 502 between the user interface 204 and the presentation logic 208 as per a protocol usage, in accordance with certain embodiments.

The presentation logic 208 may create a root element and start the process (reference numeral 504). Various types of nodes made be created (reference numerals 506 and 508)

and the user interface 204 may prepare and load corresponding user interface resources (reference numerals 510, 512).

Node ready indications 514, 516 may be sent from the presentation logic 208 to the user interface 204 and the user interface 204 may display root and login for a user 520 (reference numeral 522). The user sees a login dialog 524 and changes the user name textfield 526. As a result, the user interface 204 via a protocol sends a property change notification 528 to the presentation logic 208. Similarly in response to changes in password change textfield 530 by the user the password property change notification 532 is sent from the user interface 204 to the presentation logic 208. In response to a click of the login button 534 by the user 520, a login invokable property 536 is invoked from the user interface 204 to the presentation logic 208. The presentation logic 208 performs various authentications 536, creates main and child nodes 538, and destroys a login node 540, and then communications creation of nodes 540, 542, 544 and destruction of nodes 546 to the user interface 204. The user interface 204 removes the login dialog and displays root and login 548 and the user 520 then sees other objects 550.

Therefore, FIG. 5 shows various interactions between the user interface 204 and the presentation logic 208 in accordance with certain embodiments, as per protocols described in FIGS. 2-4 for communication between various components.

Figure 6:
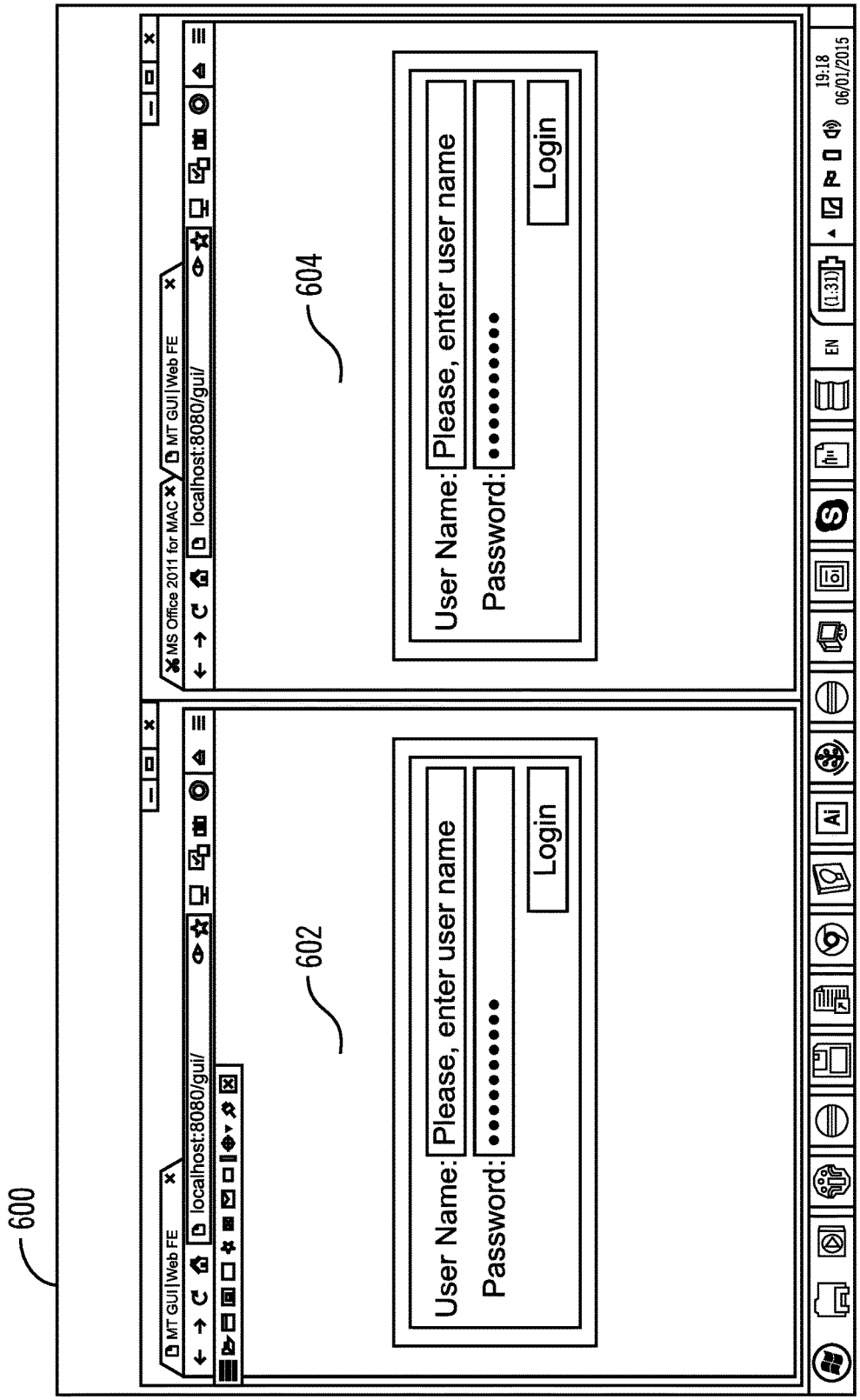
FIG. 6 illustrates a block diagram two user interface frameworks coupled to the same presentation logic, in accordance with certain embodiments.

FIG. 6 illustrates a block diagram 600 that shows the results from two user interface frameworks coupled to the same presentation logic, in accordance with certain embodiments. In FIG. 6 two graphical displays 602, 604 are displayed on a screen and the user may move the cursor between the two graphical displays 602, 604.

Figure 7:
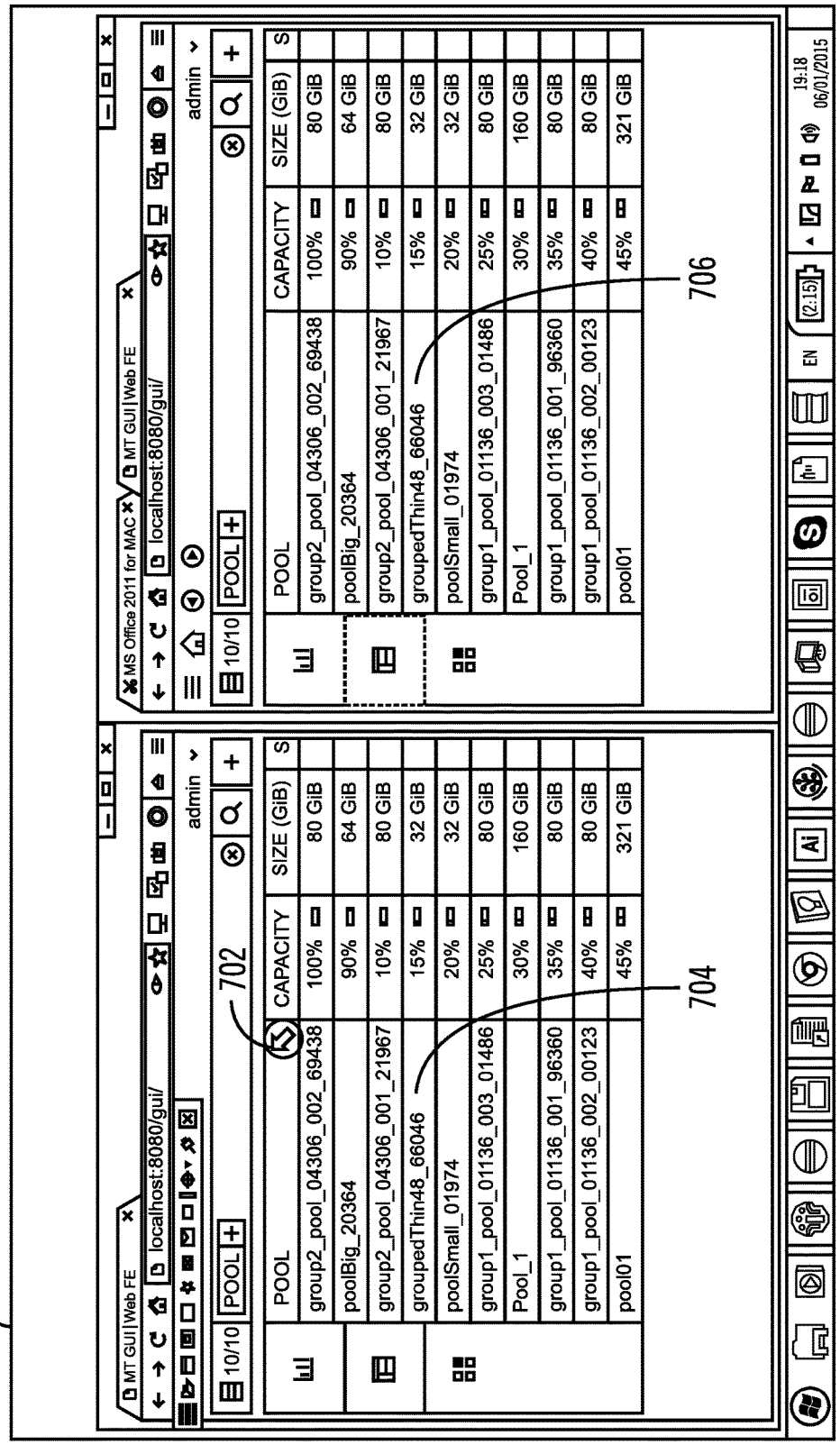
FIG. 7 illustrates a block diagram of operations in two user interface frameworks coupled to the same presentation logic, in accordance with certain embodiments.

FIG. 7 illustrates a block diagram 700 that shows operations in two user interface frameworks coupled to the same presentation logic, in accordance with certain embodiments. In FIG. 7, based on selections of the user 702, displays may be made in the user interfaces 704, 706.

Figure 8:
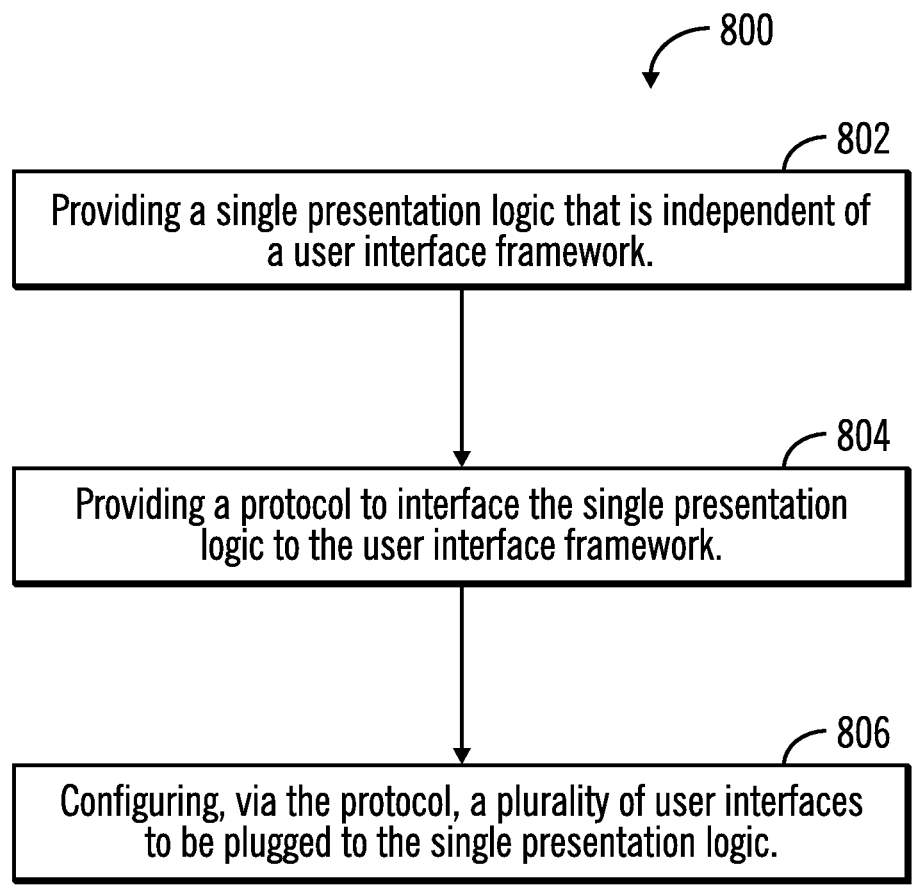
FIG. 8 illustrates certain operations performed in the computing environment of FIG. 2, in accordance with certain embodiments.

FIG. 8 illustrates certain operations 800 performed in the computing environment 200 of FIG. 2, in accordance with certain embodiments. The operations shown in FIG. 2 are performed by the computational device 202.

Control starts at block 802 in which a single presentation logic 208 that is independent of a user interface framework is provided. Also provided (at block 804) is a protocol to interface the single presentation logic 208 to the user interface framework. A plurality of user interfaces 204 is configured (at block 806) to be plugged to the single presentation logic 208.

Therefore FIGS. 1-8 illustrate certain embodiments in which the user interface code and the presentation logic are separated by using a protocol for communications.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 9:
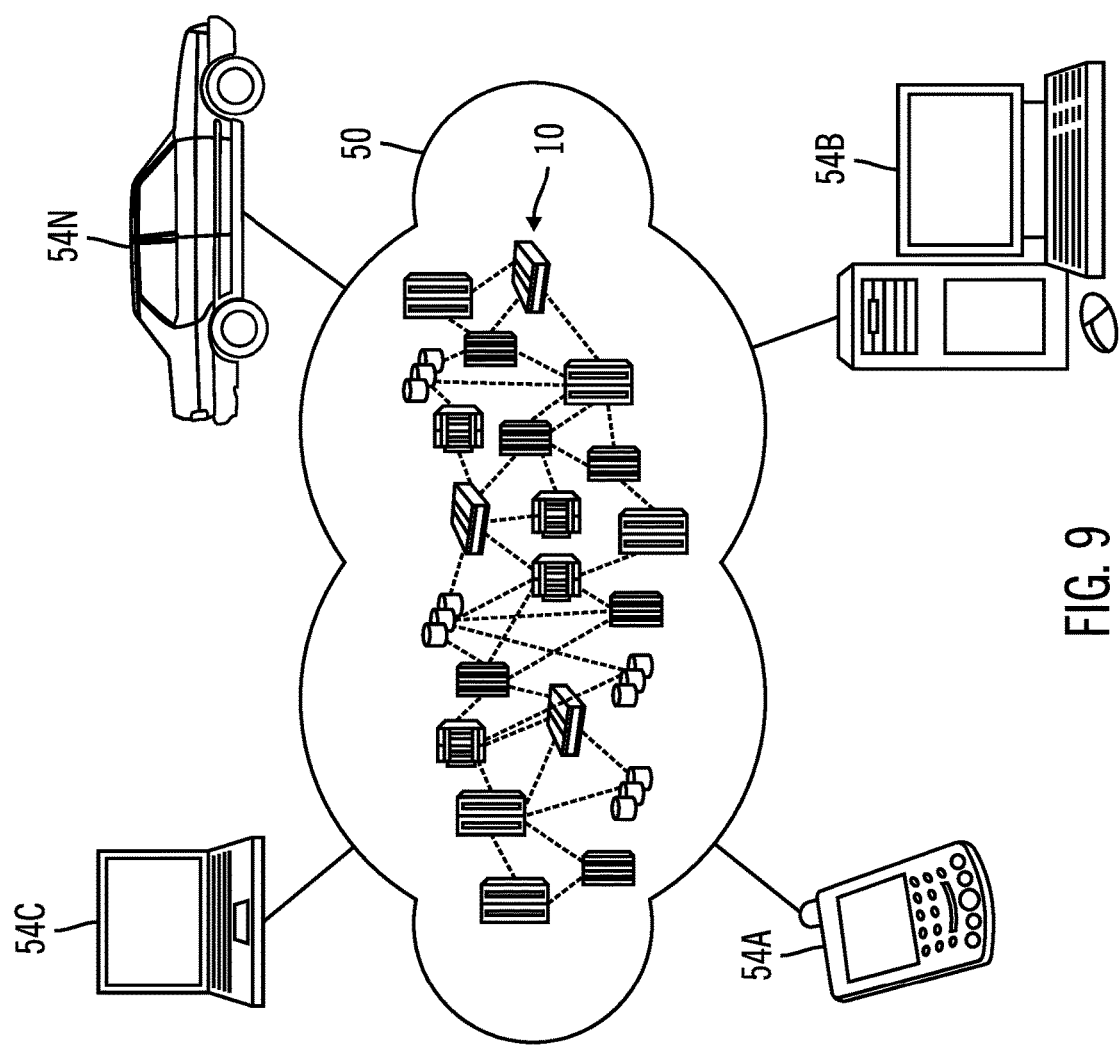
FIG. 9 illustrates a block diagram of a cloud computing environment, in accordance with certain embodiments.

Referring now to FIG. 9, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
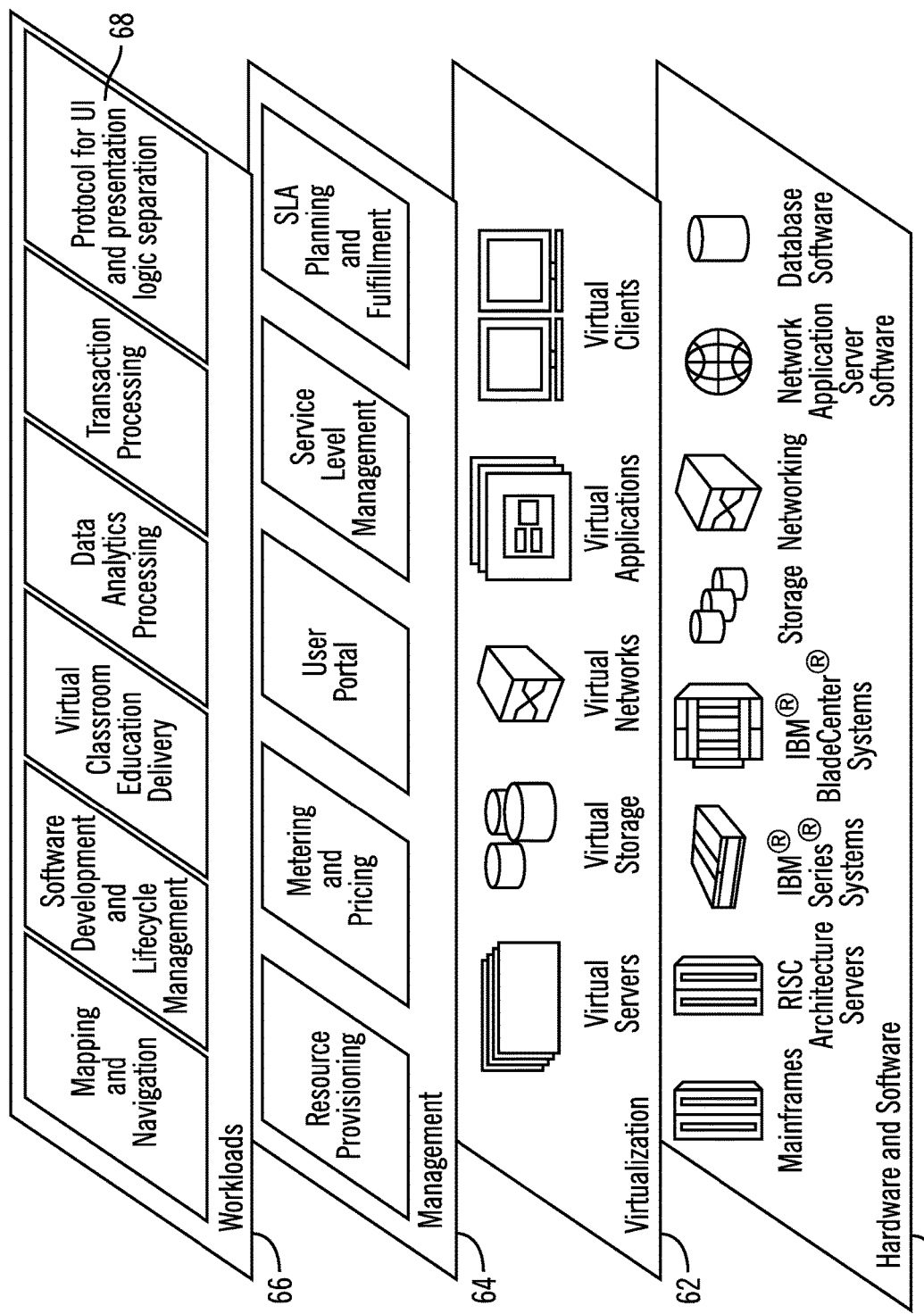
FIG. 10 illustrates a block diagram of further details of the cloud computing environment of FIG. 9, in accordance with certain embodiments.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

*IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the protocol for UI and presentation logic separation 68 as shown in FIGS. 1-9.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 11:
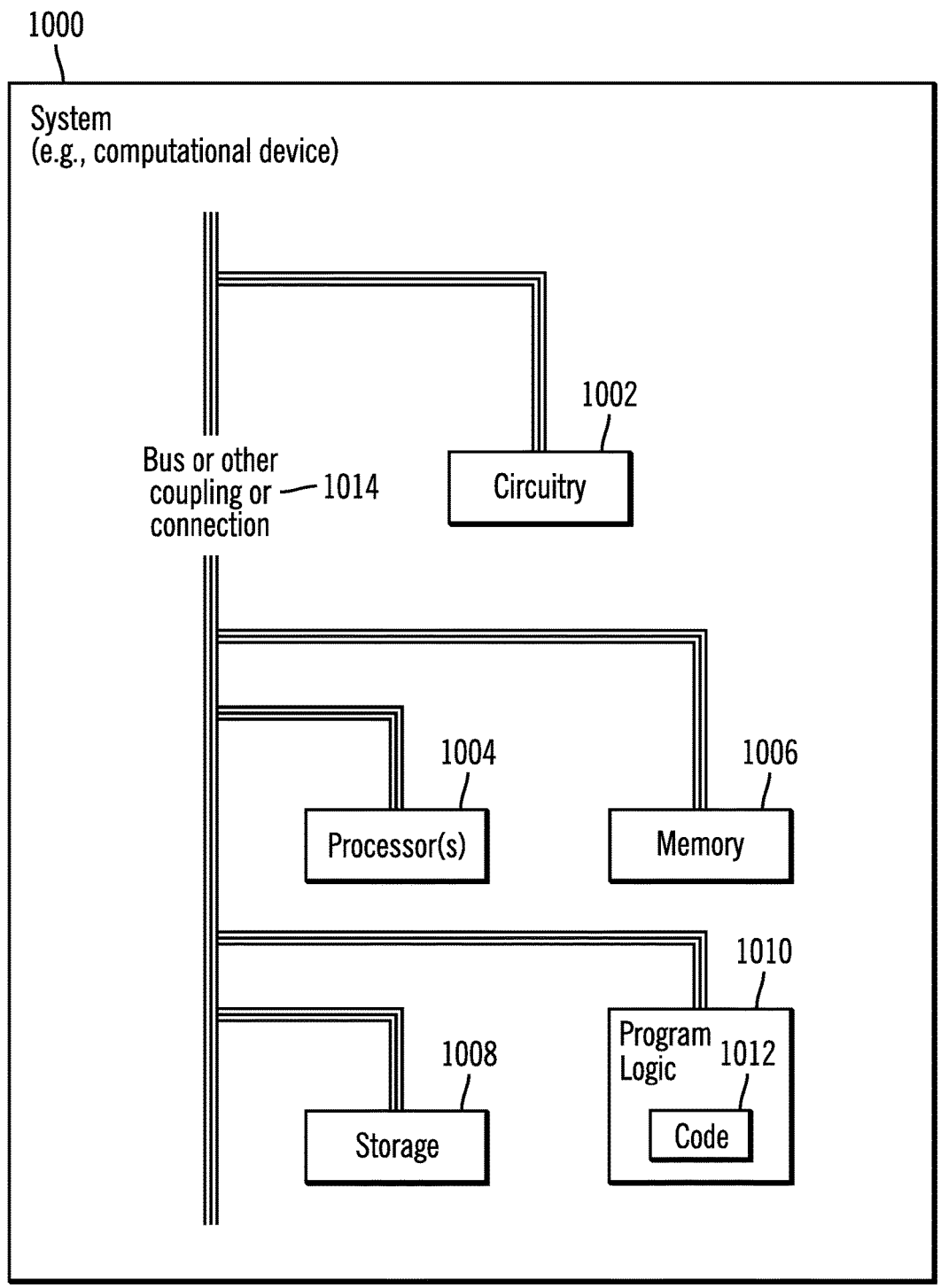
FIG. 11 illustrates a block diagram of a computational system that shows certain elements that may be included in one or more nodes, as described in FIGS. 1-10, in accordance with certain embodiments.

FIG. 11 illustrates a block diagram that shows certain elements that may be included in the computational device 202 or other computational devices in accordance with certain embodiments. The system 1100 may include a circuitry 1102 that may in certain embodiments include at least a processor 1104. The system 1100 may also include a memory 1106 (e.g., a volatile memory device), and storage 1108. The storage 1108 may include a non-volatile memory device (e.g., EEPROM, ROM, PROM, flash, firmware, programmable logic, etc.), magnetic disk drive, optical disk drive, tape drive, etc. The storage 1108 may comprise an internal storage device, an attached storage device and/or a network accessible storage device. The system 1100 may include a program logic 1110 including code 1112 that may be loaded into the memory 1106 and executed by the processor 1104 or circuitry 1102. In certain embodiments, the program logic 1110 including code 1112 may be stored in the storage 1108. In certain other embodiments, the program logic 1110 may be implemented in the circuitry 1102. One or more of the components in the system 1100 may communicate via a bus or via other coupling or connection 1114. Therefore, while FIG. 11 shows the program logic 1110 separately from the other elements, the program logic 1110 may be implemented in the memory 1106 and/or the circuitry 1102.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

providing a single presentation logic that is independent of a user interface framework;

providing a protocol to interface the single presentation logic to the user interface framework;

configuring, via the protocol, a plurality of user interfaces to be plugged to the single presentation logic;

creating a root element by the single presentation logic;

creating a plurality of nodes by the single presentation logic;

generating and loading, by a user interface of the plurality of user interfaces, user interface resources corresponding to the user interface;

transmitting node ready indications from the single presentation logic to the user interface;

in response to a change made by a user in a login dialog displayed by the user interface, sending, by the user interface via the protocol, a property change notification to the single presentation logic; and invoking a login invokable property from the user interface to the single presentation logic, in response to a selection of a login control element by the user, wherein the single presentation logic performs authentications, creates main and child nodes, and destroys a login node, and subsequently communicates creation of nodes and destruction of nodes to the user interface, and wherein the user interface removes the login dialog and displays root and login and subsequently other objects are displayed to the user.

2. The method of claim 1, the method further comprising:
receiving, by a user interface of an application updates for a component from the single presentation logic via the protocol.

3. The method of claim 2, the method further comprising:
receiving, by the single presentation logic from the user interface changes in components data, wherein the updates include hierarchy changes and data that are to be displayed to a user for the component.

4. The method of claim 1, wherein a controls generator that comprises a unique adapter between a logic nodes container comprising the single presentation logic and a user interface layer corresponding to the plurality of user interfaces, translates addition and deletion of components in the logic nodes container for the plurality of user interfaces.

5. The method of claim 1, wherein entities in code for the protocol include at least a logic node that represents a user interface component in the single presentation logic, wherein:
  a read-only property of the logic node is configurable only in the presentation logic;
  a writable property of the logic node is configurable both in the presentation logic and on the plurality of user interfaces; and
  an invokable read-only property is invokable only by a user interface.

6. The method of claim 5, wherein a nodes container is an entity in the single presentation logic, and wherein the nodes container holds a hierarchy of presentation logic nodes and sends hierarchy change messages to a user interface layer that comprises a components builder.

7. A system comprising:
  a memory; and
  a processor coupled to the memory, wherein the processor performs operations, the operations comprising:
    providing a single presentation logic that is independent of a user interface framework;
    providing a protocol to interface the single presentation logic to the user interface framework;
    configuring, via the protocol, a plurality of user interfaces to be plugged to the single presentation logic;
    creating a root element by the single presentation logic;
    creating a plurality of nodes by the single presentation;
    generating and loading, by a user interface of the plurality of user interfaces, user interface resources corresponding to the user interface;
    transmitting node ready indications from the single presentation logic to the user interface;
    in response to a change made by a user in a login dialog displayed by the user interface, sending, by the user interface via the protocol, a property change notification to the single presentation logic; and
    invoking a login invokable property from the user interface to the single presentation logic, in response to a selection of a login control element by the user, wherein the single presentation logic performs authentications, creates main and child nodes, and destroys a login node, and subsequently communicates creation of nodes and destruction of nodes to the user interface, and wherein the user interface removes the login dialog and displays root and login and subsequently other objects are displayed to the user.

8. The system of claim 7, the operations further comprising:
receiving, by a user interface of an application updates for a component from the single presentation logic via the protocol.

9. The system of claim 8, the operations further comprising:
receiving, by the single presentation logic from the user interface changes in components data, wherein the updates include hierarchy changes and data that are to be displayed to a user for the component.

10. The system of claim 7, wherein a controls generator that comprises a unique adapter between a logic nodes container comprising the single presentation logic and a user interface layer corresponding to the plurality of user interfaces, translates addition and deletion of components in the logic nodes container for the plurality of user interfaces.

11. The system of claim 7, wherein entities in code for the protocol include at least a logic node that represents a user interface component in the single presentation logic, wherein:
  a read-only property of the logic node is configurable only in the presentation logic;
  a writable property of the logic node is configurable both in the presentation logic and on the plurality of user interfaces; and
  an invokable read-only property is invokable only by a user interface.

12. The system of claim 11, wherein a nodes container is an entity in the single presentation logic, and wherein the nodes container holds a hierarchy of presentation logic nodes and sends hierarchy change messages to a user interface layer that comprises a components builder.

13. A computer program product, the computer program product comprising a computer readable storage medium having computer readable program code embodied therewith, the computer readable program code configured to perform operations, the operations comprising:
  providing a single presentation logic that is independent of a user interface framework;
  providing a protocol to interface the single presentation logic to the user interface framework;
  configuring, via the protocol, a plurality of user interfaces to be plugged to the single presentation logic;
  creating a root element by the single presentation logic;
  creating a plurality of nodes by the single presentation;
  generating and loading, by a user interface of the plurality of user interfaces, user interface resources corresponding to the user interface;
  transmitting node ready indications from the single presentation logic to the user interface;
  in response to a change made by a user in a login dialog displayed by the user interface, sending, by the user interface via the protocol, a property change notification to the single presentation logic; and
  invoking a login invokable property from the user interface to the single presentation logic, in response to a selection of a login control element by the user, wherein the single presentation logic performs authentications, creates main and child nodes, and destroys a login node, and subsequently communicates creation of nodes and destruction of nodes to the user interface, and wherein the user interface removes the login dialog and displays root and login and subsequently other objects are displayed to the user.

14. The computer program product of claim 13, the operations further comprising:
   receiving, by a user interface of an application updates for a component from the single presentation logic via the protocol.

15. The computer program product of claim 14, the operations further comprising:
   receiving, by the single presentation logic from the user interface changes in components data, wherein the updates include hierarchy changes and data that are to be displayed to a user for the component.

16. The computer program product of claim 13, wherein a controls generator that comprises a unique adapter between a logic nodes container comprising the single presentation logic and a user interface layer corresponding to the plurality of user interfaces, translates addition and deletion of components in the logic nodes container for the plurality of user interfaces.

17. The computer program product of claim 13, wherein entities in code for the protocol include at least a logic node that represents a user interface component in the single presentation logic, wherein:
   a read-only property of the logic node is configurable only in the presentation logic;
   a writable property of the logic node is configurable both in the presentation logic and on the plurality of user interfaces;
   an invokable read-only property is invokable only by a user interface; and
   a nodes container is an entity in the single presentation logic, wherein the nodes container holds a hierarchy of presentation logic nodes and sends hierarchy change messages to a user interface layer that comprises a components builder.

* * * * *